United States Patent
Chen et al.

(10) Patent No.: US 7,458,722 B2
(45) Date of Patent: Dec. 2, 2008

(54) MAGNETIC SPACER

(75) Inventors: Yan-Yu Chen, Taichung (TW); Kenny Lin, Taichung (TW); Wen-Chia Wu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 282 days.

(21) Appl. No.: 11/277,768

(22) Filed: Mar. 29, 2006

(65) Prior Publication Data

US 2007/0230847 A1    Oct. 4, 2007

(51) Int. Cl.
*F16C 33/37*    (2006.01)

(52) U.S. Cl. .......................... 384/51; 384/446; 384/520

(58) Field of Classification Search ................ 384/446, 384/520–522, 551–553, 51; 74/424.71, 424.88; 446/129, 137, 138
See application file for complete search history.

(56) References Cited

U.S. PATENT DOCUMENTS

| | | | | |
|---|---|---|---|---|
| 3,011,842 A | * | 12/1961 | Norris | 384/446 |
| 3,016,274 A | * | 1/1962 | Norris | 384/446 |
| 3,895,846 A | * | 7/1975 | Edwards | 310/90.5 |
| 3,977,739 A | * | 8/1976 | Moskowitz et al. | 384/446 |
| 6,347,558 B1 | * | 2/2002 | Miyaguchi et al. | 74/424.71 |
| 6,513,978 B2 | * | 2/2003 | Shirai et al. | 384/45 |
| 2005/0118926 A1 | * | 6/2005 | Roger | 446/137 |
| 2006/0196292 A1 | * | 9/2006 | Tsou et al. | 74/424.88 |

FOREIGN PATENT DOCUMENTS

JP    10318266 A    * 12/1998

* cited by examiner

*Primary Examiner*—Thomas R Hannon
(74) *Attorney, Agent, or Firm*—Banger Shia (57) ABSTRACT

A spacer contains a magnetic filler and is disposed between the magnetic conductive balls. The magnetic filler produces an indirect magnetic attractive force on the balls, therefore, when the interval between the two neighboring balls is over-large, the spacer will not tip over under the effect of gravity or centrifugal force, but will be adsorbed on the balls by the magnetic filler.

1 Claim, 9 Drawing Sheets

MAGNETIC SPACER

BACKGROUND OF THE INVENTION

1. Field of the Invention

The present invention relates to a spacer that is used in a linear transmission element and operates between balls of the linear transmission element, this spacer will not tip over under the effect of gravity or centrifugal force, thus enabling the linear transmission element to operate more smoothly.

2. Description of the Prior Art

Since linear transmission products are being applied more and more widely in the modern industry, various linear transmission mechanisms have widely come into human life, manufacturing factory and high science and technology instruments, such as linear guideway, ball screw, and the like. Particularly in a large-scale precision mechanism are usually installed various large and small ball screws or linear guideway systems. Although the technology for linear transmission element is developing fast, consumers still need the technology to be improved uninterruptedly. Therefore, there are still some problems to be solved. And this desire for constant improvement of technology is particular strong in many high precision mechanism-manufacturing fields that require comparative stability and quiet. Hence, the existing linear mechanism still has some technological blind spots to be improved.

Figure 1:
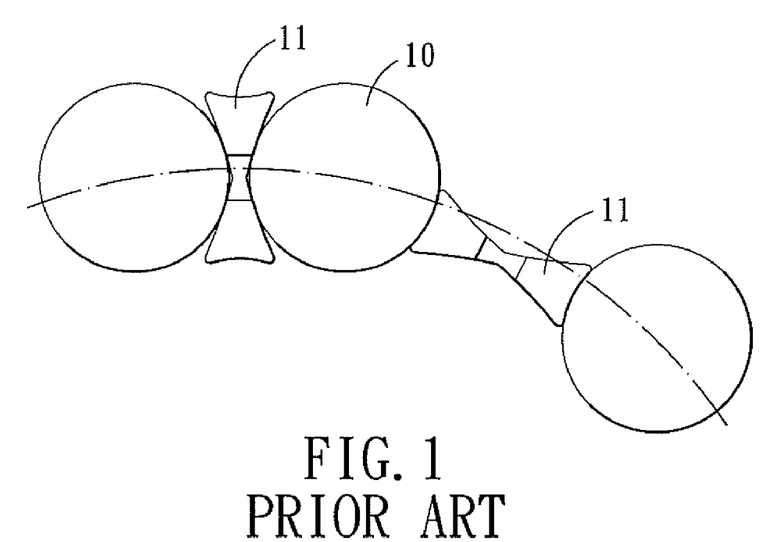
FIG. 1 is an illustrative view of a conventional spacer.
Figure 5:
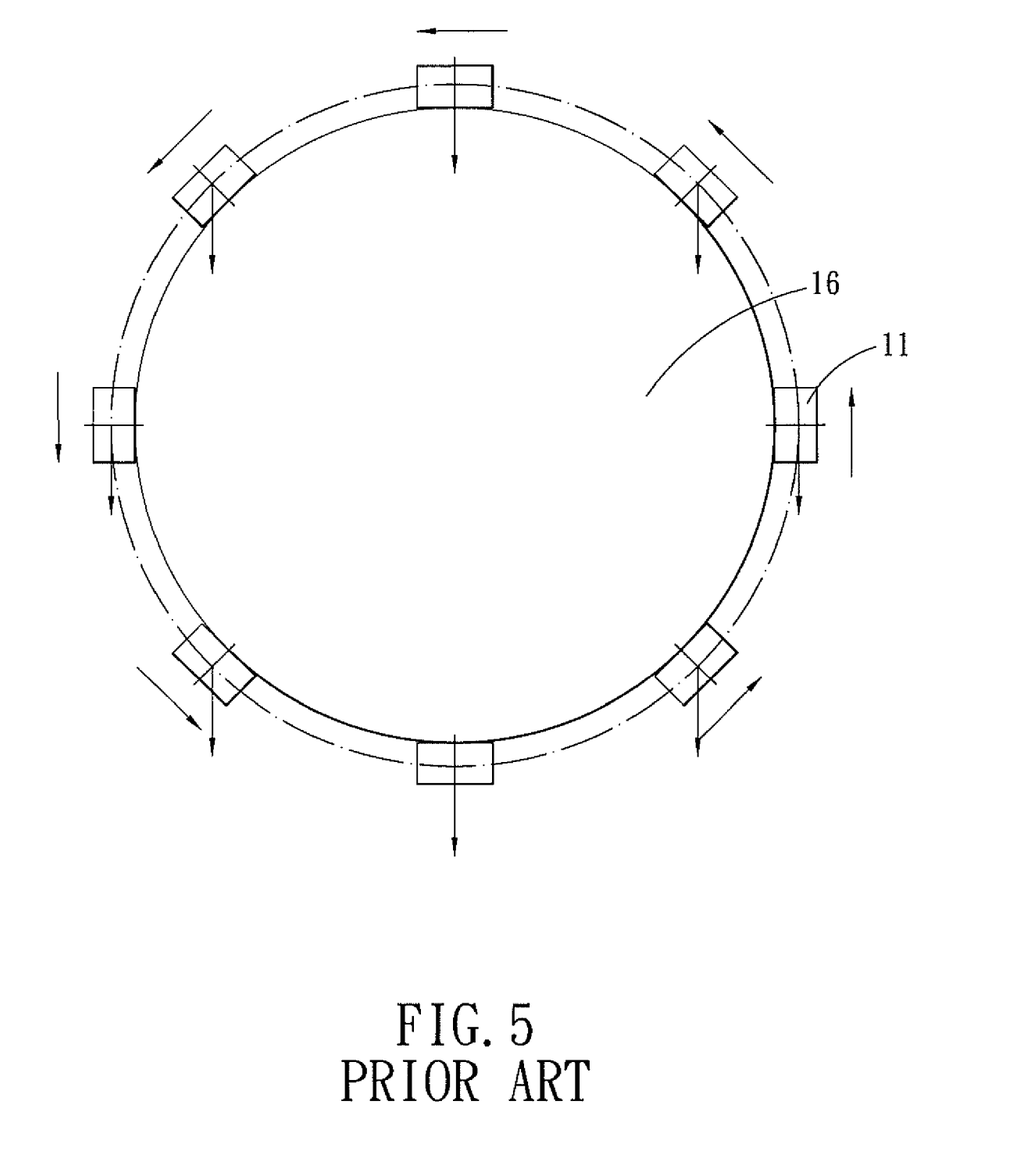
FIG. 5 is an illustrative view of illustrating the work principle of a conventional ball screw.

As shown in FIG. 1, a conventional ball screw system is usually provided with a plurality of spacers 11 arranged between the balls 10 for prevention of impact, abrasion and noise. Most of the spacer 11 products are required to be miniaturized, unitary and made of single material, however, they not practical because of the following reasons:

Since intervals must be reserved between each pair of balls 10 during installation of balls 10 into the ball screw, for enabling the balls 10 to roll smoothly (balls will not be jammed in the system). However, if the reserved intervals between the balls 10 are gathered together, it will form a space that is large enough to make the spacers 11 fall down easily, and the spacers 11 fell down on the surface of the screw shaft 16 will interfere the operation of the balls 10. As shown in FIG. 5, the center of gravity of the spacers 11 will be kept in a tipped over position under the effect of the rotation of the screw shaft 16. Therefore, the spacers 11 are impossible to stand up automatically, and this will probably cause failure of the whole ball screw system.

In use, the non-uniform rotating speed of the balls 10 also will result in an occurrence of an overlarge distance between the balls 10, making it impossible to hold the spacers 11 firmly. Therefore, the spacers 11 are likely to tip over or to rub against the helical grooves of the screw shaft and the nut, adversely affecting the service life and the efficiency of the ball screw and the linear guideway.

Hence, with the popularization of the linear transmission application, the demand of solving the aforementioned problems is becoming more and more urgent, and manufacturing a ball screw less susceptible to failure has become the most important selling point that the manufactures are striving for. Therefore, how to develop a linear transmission element more satisfying the user's needs has become a focal point in the linear transmission unit manufacturing field.

Figure 2:
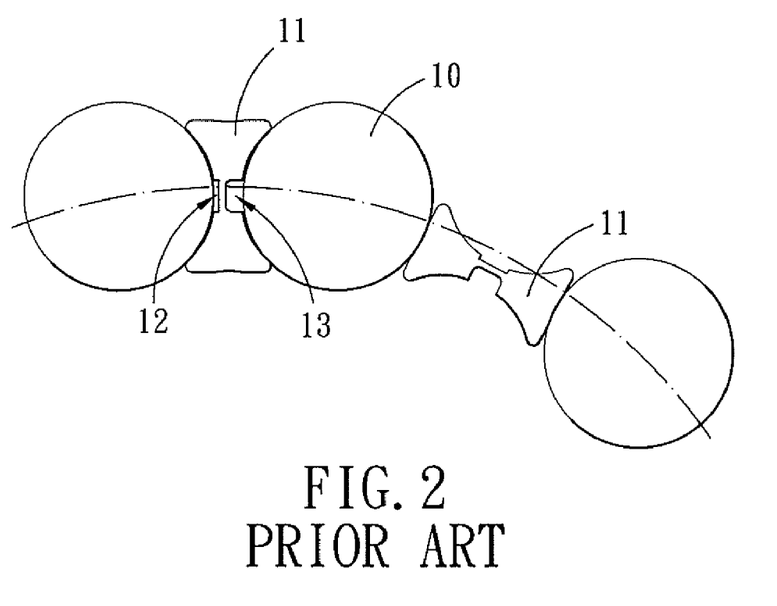
FIG. 2 is an illustrative view of another conventional spacer.

What follows are some examples of the existing products:

As shown in FIG. 2, wherein each of the spacers 11 is designed to use flat surface and arc surface to contact the balls 10, the spacers 11 are arranged between the balls 10 and each is formed in both lateral surfaces with a left and right cavities 12 and 13. However, when the reserved intervals between the balls 10 are gathered together, the spacers 11 also will fall down easily without the possibility of standing up again (as shown in FIG. 5), thus causing failure of the whole ball screw system.

Figure 3:
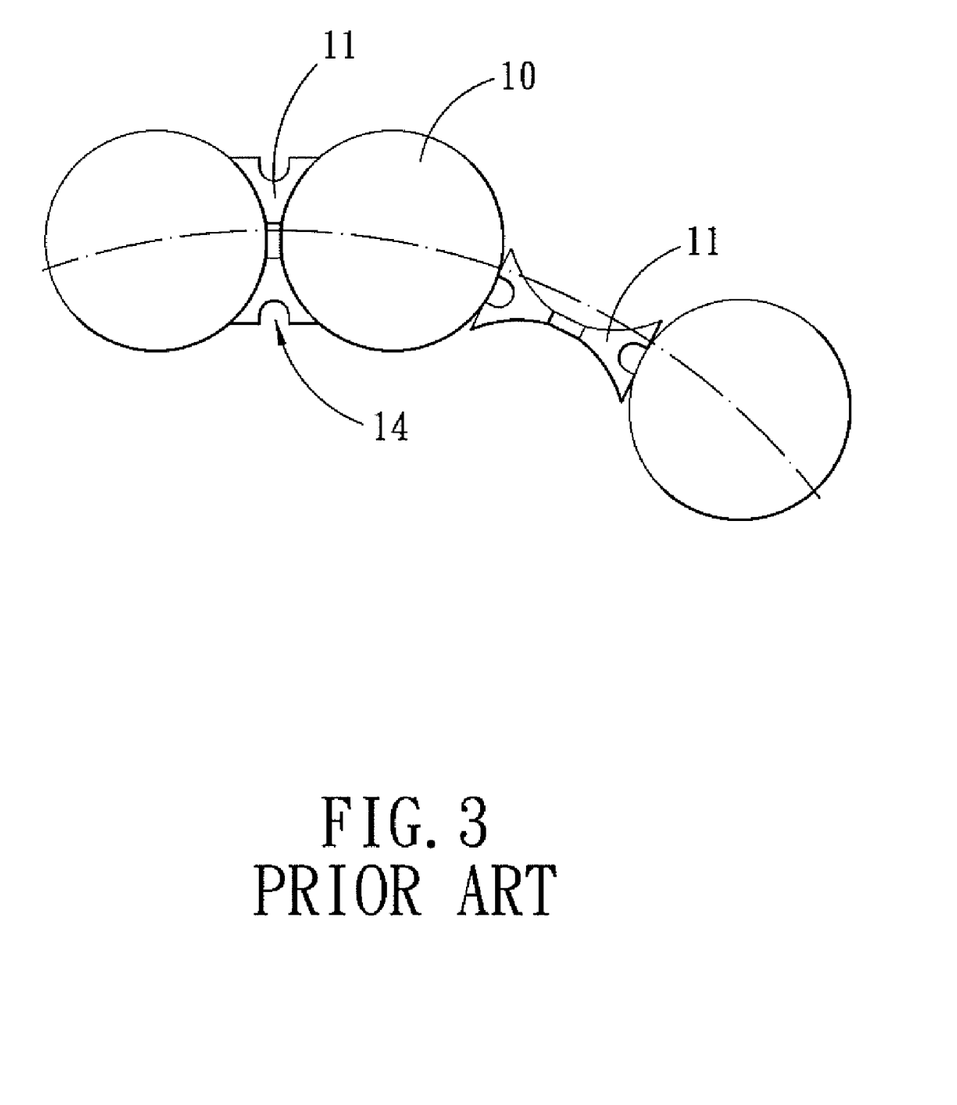
FIG. 3 shows a spacer disclosed by U.S. Pat. No. 6,513,978.

FIG. 3 shows a structure disclosed in U.S. Pat. No. 6,513,978, wherein an annular groove 14 is formed in the outer surface of the respective spacers 11. However, when the reserved intervals between the balls 10 are gathered together, the spacers 11 also will fall down easily without the possibility of standing up again (as shown in FIG. 5), thus causing failure of the whole ball screw system.

Figure 4:
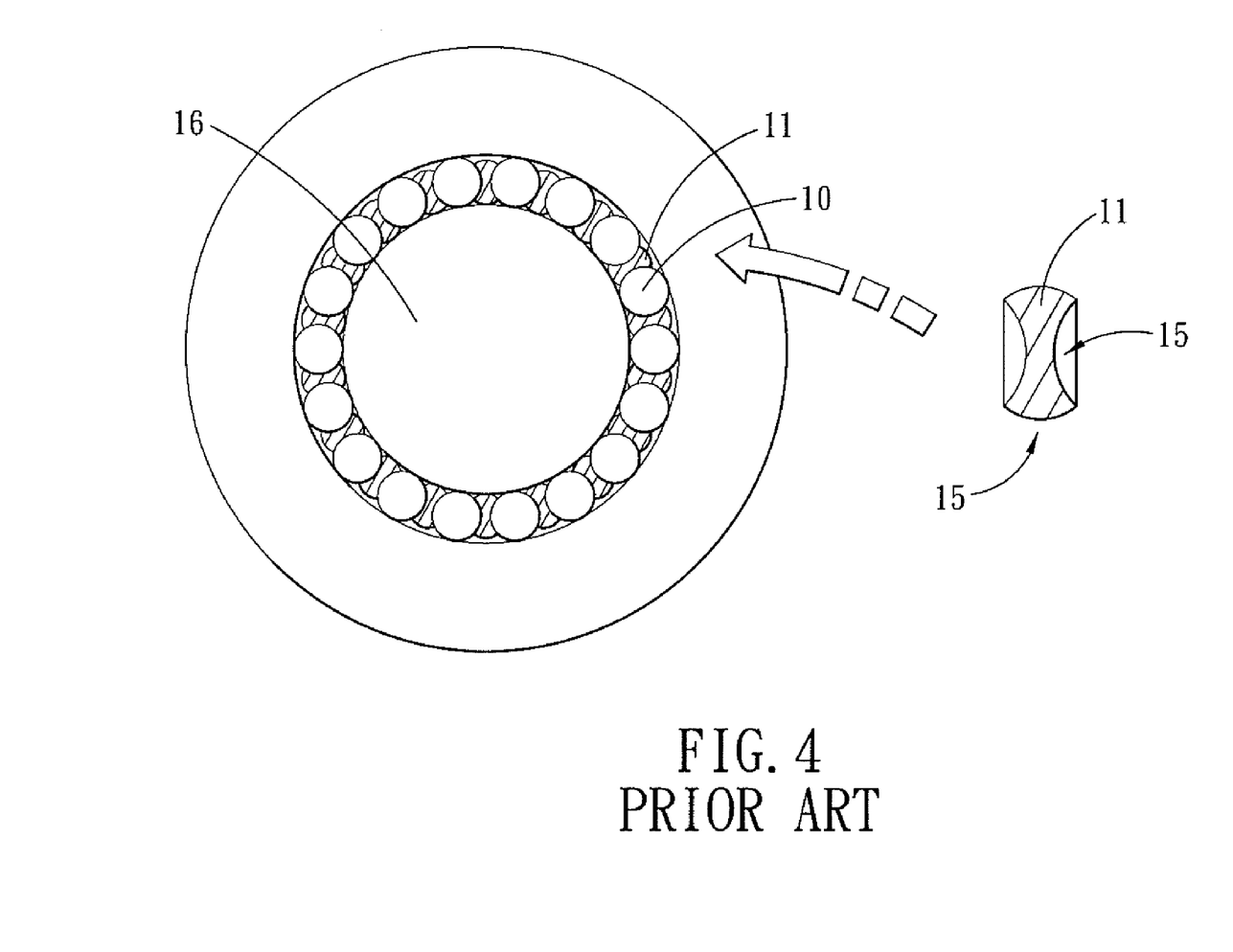
FIG. 4 shows a spacer disclosed by U.S. Pat. No. 6,347,558.

FIG. 4 shows a structure disclosed in U.S. Pat. No. 6,347,558, the inner and outer cross sections of the spacers 11 are Gothic-shaped so as to have a smooth arc surface 15. Although this type spacer 11 is able to roll when tipping over, it is still unable to stand up again when it completely falls down on the screw shaft 16 (as shown in FIG. 5), causing failure of the whole ball screw system.

The present invention has arisen to mitigate and/or obviate the afore-described disadvantages.

SUMMARY OF THE INVENTION

The primary objective of the present invention is to provide a magnetic spacer that can be prevented from tipping over.

A magnetic filler is received in the spacer for producing a magnetic force between the magnetic filler and the balls. Therefore, when the space between the two neighboring balls is overlarge, the spacer will not tip over under the effect of gravity or centrifugal force, but will be adsorbed on the balls by the magnetic filler.

The secondary objective of the present invention is to provide a magnetic spacer that will have a rotating function under the effect of magnetic force.

The spacer of the present invention not only can be adsorbed on the balls, but also utilizes the different specific gravity material of the magnetic filler to shift the center of gravity of the spacer, keeping the magnetic filler outward during operation, thus achieving the effect of preventing tipping over, and enabling the spacer to stand up automatically under the effect of gravity and centrifugal force.

The aforesaid gravity and centrifugal force are called "acceleration force". Gravity is a gravity acceleration force applied on the spacer by the earth. The centrifugal force is an inertial force caused by the rotation of the spacer, which is the counterforce to the acceleration centripetal force. The magnetic force is a permanent force caused in response to change in atom arrangement (the indirect magnetic force can prevent the elements from magnetization). All these three forces are force acting at a distance, therefore, when different parts of the spacer have different specific gravities, and with the aid of the indirect magnetic force, the spacer will be inclined toward the relatively heavier side along with the centrifugal force (when the spacer rotates around the screw shaft, the resultant centrifugal force will keep the center of gravity side of the spacer facing outward). Plus the influence of the magnetic force, the spacer of the present invention can be reliably prevented from tipping over.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 6:
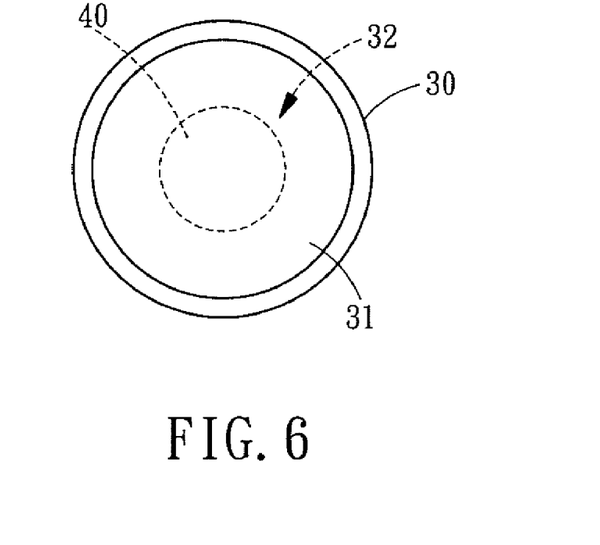
FIG. 6 is an illustrative view of a spacer in accordance with the present invention.
Figure 7:
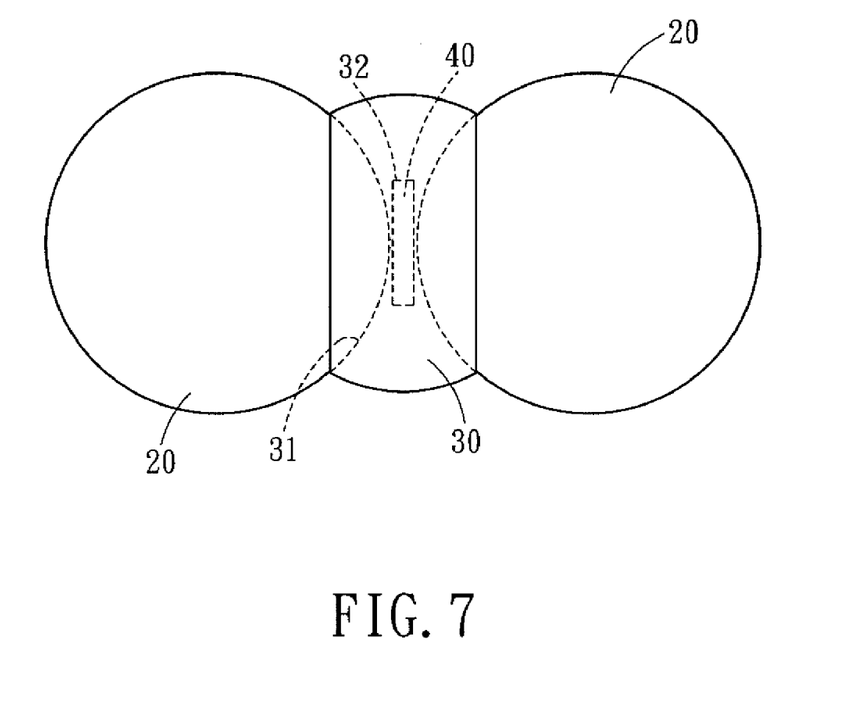
FIG. 7 is a side view of a spacer in accordance with a first embodiment of the present invention.
Figure 8:
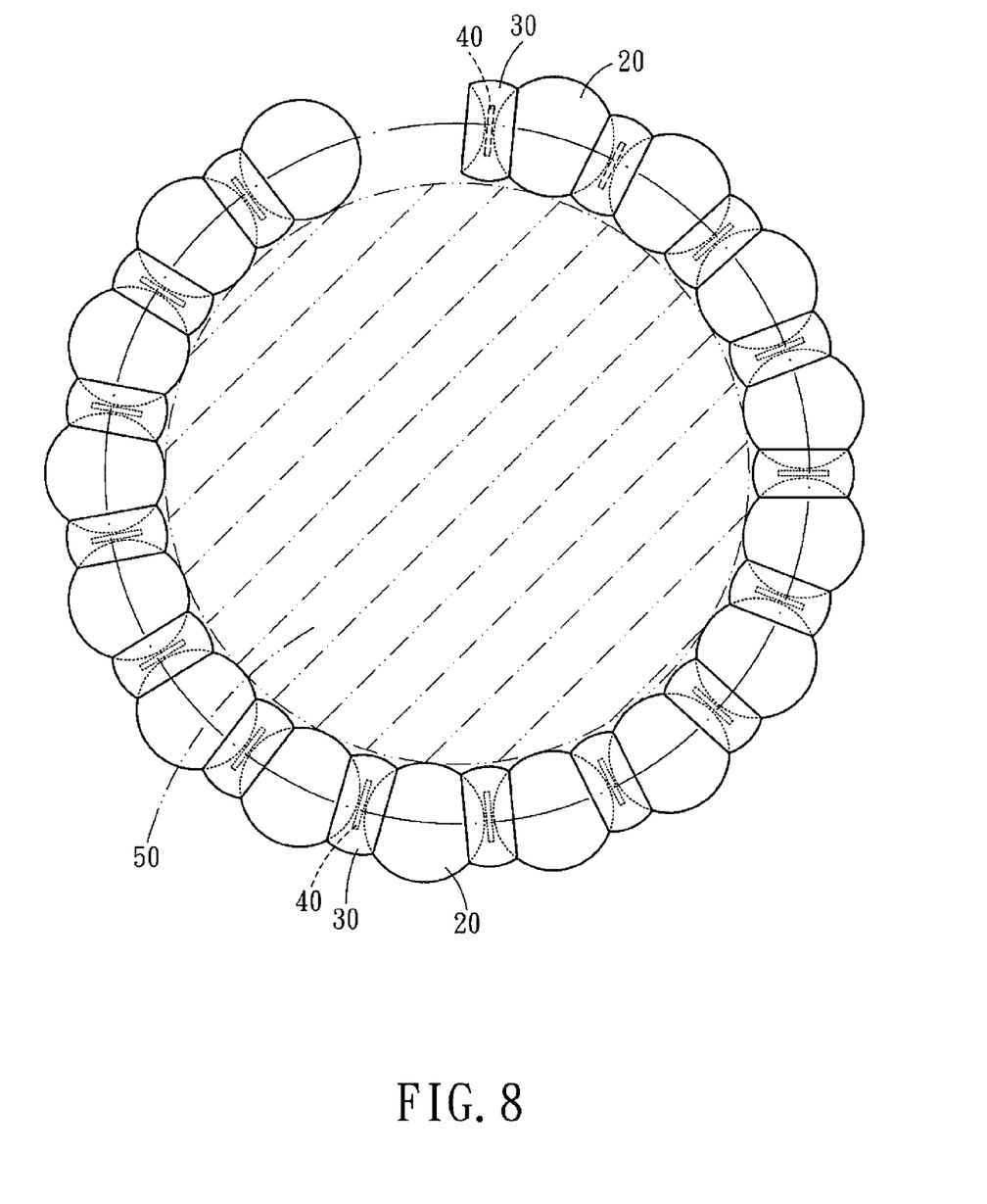
FIG. 8 is an illustrative view of showing a ball screw in accordance with the first embodiment of the present invention.

The foregoing, and additional objects, features and advantages of the present invention will become apparent from the following detailed description of preferred embodiments thereof, taken in conjunction with the accompanying FIGS. 6-8 (The ball screw in this embodiment is intended as an example only, and not as a limitation).

The spacers 30 in accordance with the present invention are arranged between the respective balls 20 of a ball screw and a linear guideway, and move in the helical groove of the screw shaft 50, which are characterized in that:

A Gothic type arc groove 31 is formed in each side of the respective spacers 30, and at least a receiving space 32 is defined in each of the spacers 30.

Magnetic filler 40 is filled in the receiving space 32 of the spacers 30 and serves to produce an indirect magnetic attractive force on the balls 20.

The aforesaid arc groove 31 can be of Gothic type or a general arc, and the inner surface of the arc groove 31 is formed with concave and convex structure (for reducing of friction). Furthermore, there is no special requirement on the material of the aforesaid balls 20 as long as it is of magnetic conductive materials (such as iron, cobaltco, nickel, etc). It is should be noted that a magnetic product made of different materials is also encompassed within the present invention.

For a better understanding of the first embodiment, its operation and function, reference should be made to FIG. 8.

Since the magnetic filler 40 is filled in the receiving space 32 of the spacers 30, and the balls 20 are magnetic conductive, an indirect magnetic attractive force will be produced between the filler 40 and the respective balls 20, and the strongest magnetic field is located on the line connecting the centers of the respective balls 20. However, the contacting point of the spacer 30 and the ball 20 is located at either side of the arc groove 31 (normally, the arc groove is of Gothic type), and thus the ball 20 will not directly contact the coating layer covering the magnetic filler 40, preventing abrasion of the magnetic spacers 30.

If the reserved intervals between the whole array of the balls 20 are gathered together in the helical groove of the screw shaft 50, each of the magnetic spacers 30 will be adsorbed on a side of the respective balls 20 by the indirect magnetic force. Hence, the present invention is really a spacer that is less likely to tip over, and can prevent failure of the ball screw system without requiring the user to disassemble the structure.

Figure 9:
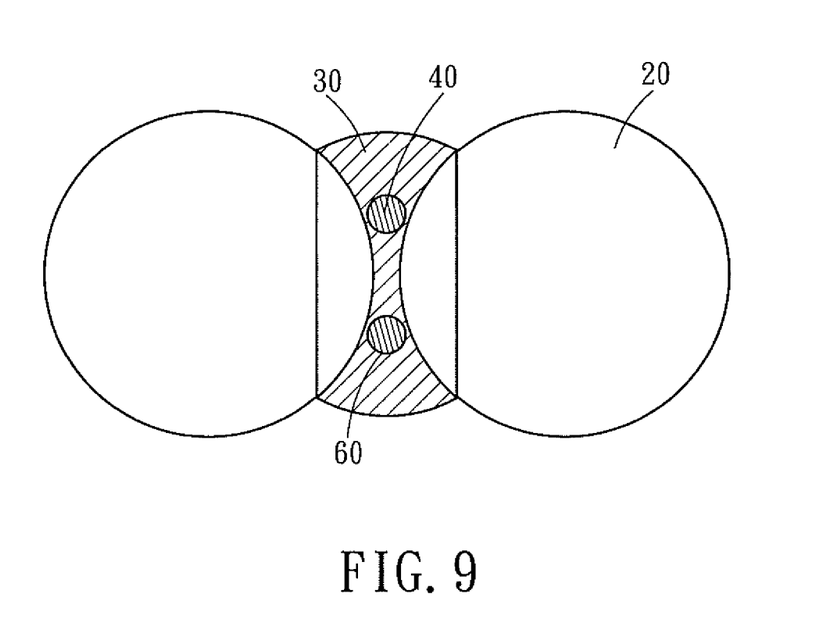
FIG. 9 is a side view of a spacer in accordance with a second embodiment of the present invention.

Referring to FIG. 9, which shows a second embodiment of the present invention, and the structure of this embodiment is explained as follows:

An arc groove 31 is formed in each side of the respective spacers 30, and an annular receiving space 60 is defined in each of the spacers 30 for accommodation of magnetic filler 40. Such annular receiving space 60 not only increases the filling amount of the magnetic filler 40 while reducing the intervals, but also enables spacers 30 to be adsorbed on the balls 20 more stably and effectively.

Figure 10:
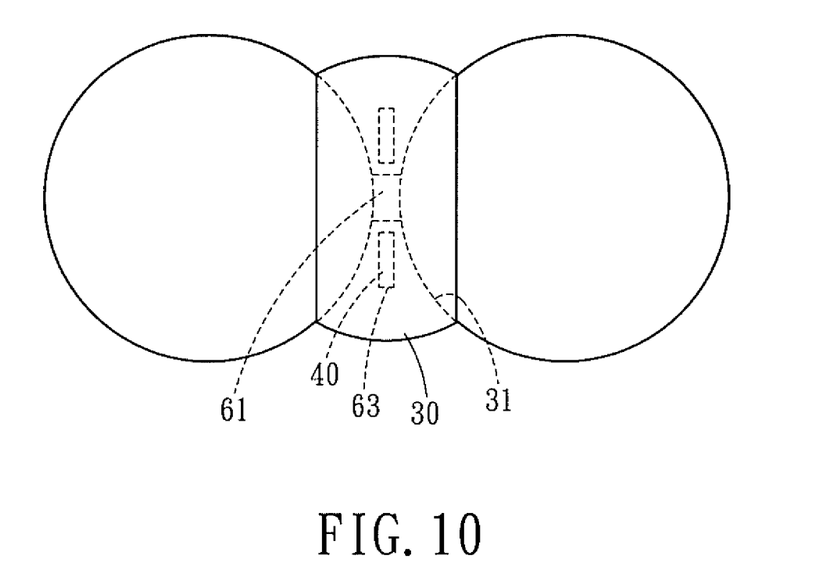
FIG. 10 is a side view of a spacer in accordance with a third embodiment of the present invention.

Referring then to FIG. 10, which shows a third embodiment of the present invention, and the structure of this embodiment is explained as follows:

The respective spacers 30 are formed with arc grooves 31 and a through hole 61, and two circular receiving spaces 63 are defined beside the through hole 61 for accommodation of the magnetic filler 40. The arc grooves 31 can enable the magnetic filler 40 of the spacers 30 to be adsorbed on the balls 20 more stably and effectively, and the through hole 61 can reduce the friction between the spacer 30 and the balls 20 at both sides thereof.

Figure 11:
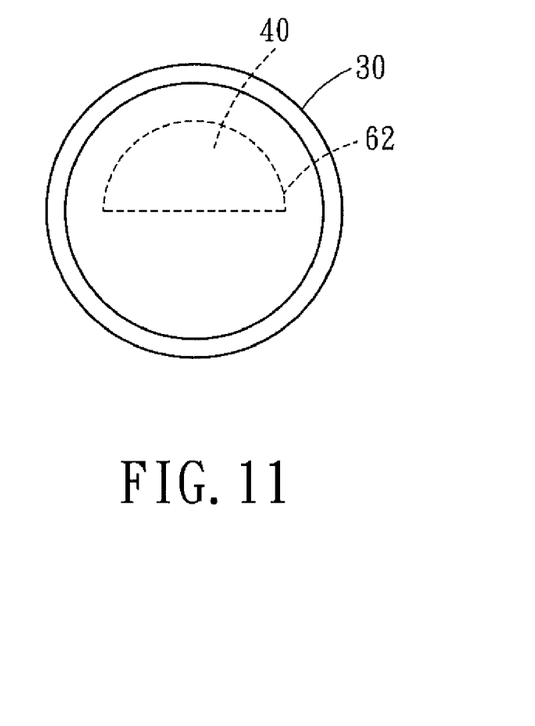
FIG. 11 is an illustrative view of a spacer in accordance with a fourth embodiment of the present invention.
Figure 12:
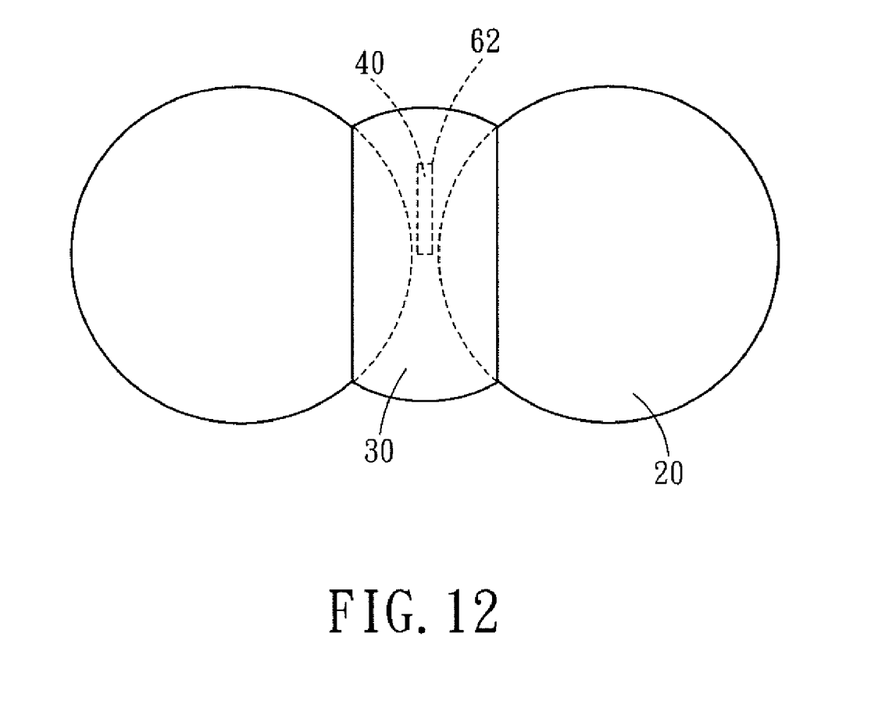
FIG. 12 is a side view of a spacer in accordance with the fourth embodiment of the present invention.
Figure 13:
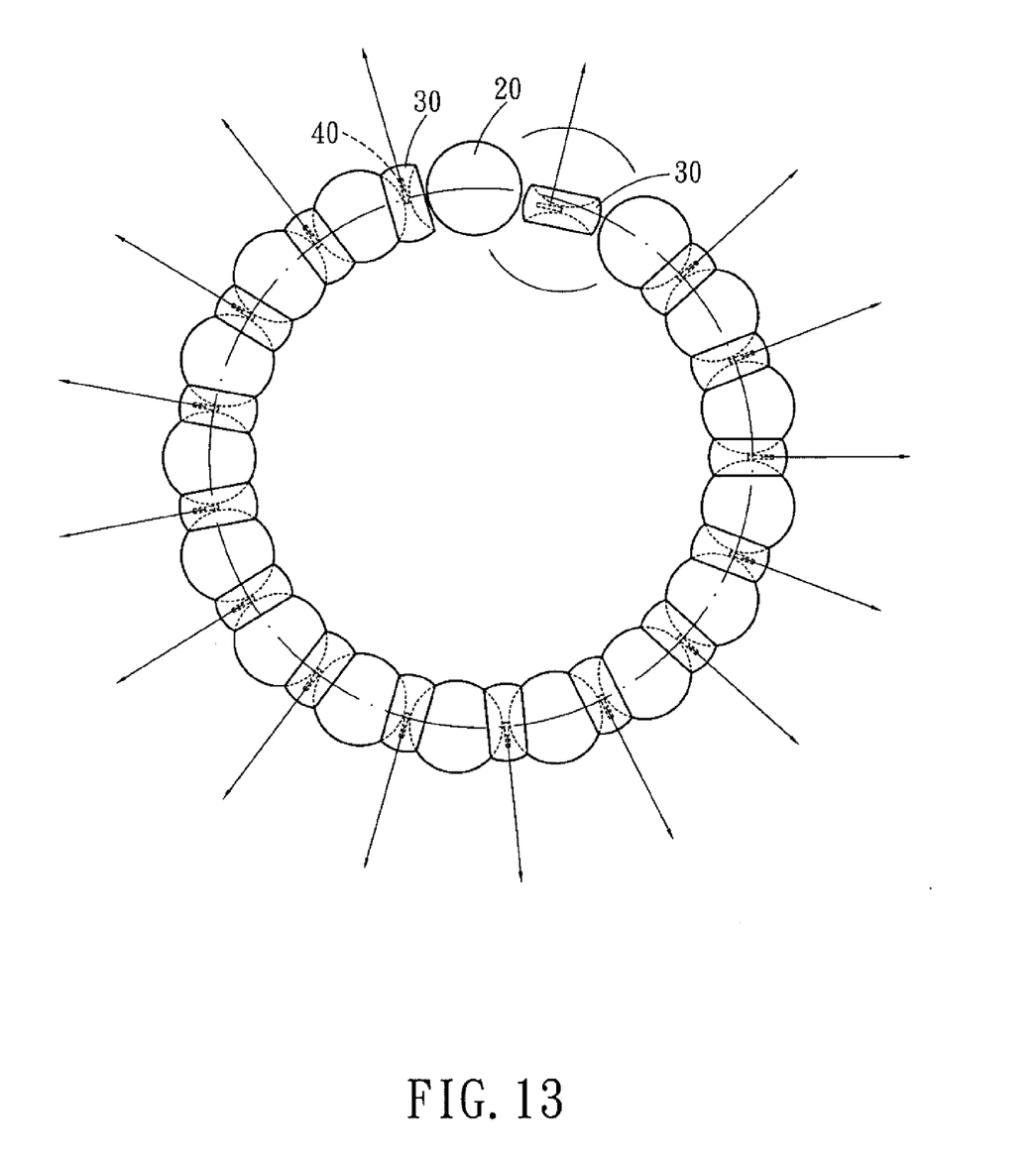
FIG. 13 is an illustrative view of showing a ball screw in accordance with the fourth embodiment of the present invention.

Referring finally to FIGS. 11-13, which shows a forth embodiment of the present invention. Each of the spacers 30 is formed with a semicircular receiving space 62 located at a side of the center of the respective spacers 30 for accommodation of the magnetic filler 40, and the specific gravity of the magnetic filler 40 is different from that of the spacers 30.

The semicircular receiving space 62 can enable the different specific gravity of the magnetic filler 40 to affect the spacers 30, causing center of gravity shift, so that, during operation, the respective spacers 30 will rotate under the effect of gravity and centrifugal force while keeping the magnetic filler side of the spacers 30 outward. Therefore, the spacers 30 can be prevented from tipping over. If spacers 30 are disengaged due to the impacting force acted on the balls 20 is greater than the magnetic force of the spacers 30, the shifted center of gravity of the spacers 30 will make the spacers 30 rotate along the outer periphery of the screw shaft 50. The resultant centrifugal force will speed up the rotation of the spacers 30, making the spacers 30 return to their original position and adsorb the balls 20 again.

The present invention is applicable to various linear transmission elements having spacers and balls, including linear guideway, ball screw and the like.

To summarize, the innovative designed spacer of the present invention contains a magnetic filler and is disposed between the magnetic conductive balls. The magnetic filler produces an indirect magnetic attractive force on the balls, therefore, when the interval between the two neighboring balls is overlarge, the spacer will not tip over under the effect of gravity or centrifugal force, but will be adsorbed on the balls by the magnetic filler.

While we have shown and described various embodiments in accordance with the present invention, it should be clear to those skilled in the art that further embodiments may be made without departing from the scope of the present invention.

What is claimed is:

1. A magnetic spacer disposed between balls of a linear transmission element, characterized in that:
   the balls are magnetic conductive;
   a magnetic filler is filled in the spacer, and can produce an indirect magnetic attractive force on the balls, during operation, the spacer between the balls will be adsorbed on the balls, thus preventing from tipping over;
   an arc groove is formed at either side of the spacer for cooperating with the balls,
   a through hole is formed in the spacer for cooperating with the balls, and at least two receiving spaces are defined in the spacer for accommodation of the magnetic filler.

* * * * *